United States Patent
Maeda et al.

(10) Patent No.: US 8,070,346 B2
(45) Date of Patent: Dec. 6, 2011

(54) ILLUMINATION DEVICE AND LIQUID CRYSTAL DISPLAY DEVICE

(75) Inventors: Satoshi Maeda, Kawasaki (JP); Hirokazu Aritake, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/899,748

(22) Filed: Sep. 7, 2007

(65) Prior Publication Data

US 2008/0002431 A1    Jan. 3, 2008

Related U.S. Application Data

(63) Continuation of application No. PCT/JP2005/004780, filed on Mar. 17, 2005.

(51) Int. Cl.
*F21V 7/04* (2006.01)
*F21V 7/22* (2006.01)

(52) U.S. Cl. ......... 362/627; 362/620; 362/626; 362/621

(58) Field of Classification Search ............. 362/623, 362/625, 626, 617–622, 627
See application file for complete search history.

(56) References Cited

U.S. PATENT DOCUMENTS

| | | | | |
|---|---|---|---|---|
| 5,253,089 A * | 10/1993 | Imai | | 349/65 |
| 5,420,761 A * | 5/1995 | DuNah et al. | | 362/623 |
| 5,709,447 A * | 1/1998 | Murakami et al. | | 362/621 |
| 5,854,872 A * | 12/1998 | Tai | | 385/133 |
| 5,986,727 A * | 11/1999 | Fukui et al. | | 349/65 |
| 5,999,685 A * | 12/1999 | Goto et al. | | 385/146 |
| 6,106,128 A * | 8/2000 | Zou et al. | | 362/606 |
| 6,474,827 B2 * | 11/2002 | Shinohara et al. | | 362/607 |
| 6,648,485 B1 * | 11/2003 | Colgan et al. | | 362/600 |
| 6,827,458 B2 * | 12/2004 | Suga | | 362/609 |
| 7,086,773 B2 * | 8/2006 | Kim et al. | | 362/621 |
| 7,206,491 B2 * | 4/2007 | Feng et al. | | 385/146 |
| 7,220,043 B2 * | 5/2007 | Cha et al. | | 362/621 |
| 7,663,713 B2 * | 2/2010 | Saito et al. | | 349/65 |
| 7,918,597 B2 * | 4/2011 | Kunimochi | | 362/608 |
| 2003/0184690 A1 * | 10/2003 | Ogiwara et al. | | 349/61 |
| 2003/0193631 A1 * | 10/2003 | Chiou | | 349/65 |
| 2004/0120139 A1 * | 6/2004 | Kunimochi et al. | | 362/31 |
| 2004/0130882 A1 * | 7/2004 | Hara et al. | | 362/31 |
| 2005/0117370 A1 * | 6/2005 | Kawashima et al. | | 362/615 |
| 2005/0243575 A1 * | 11/2005 | Kunimochi | | 362/606 |
| 2006/0007704 A1 * | 1/2006 | Mori et al. | | 362/613 |
| 2007/0086208 A1 * | 4/2007 | Lee et al. | | 362/613 |
| 2007/0091642 A1 * | 4/2007 | Lee et al. | | 362/621 |
| 2008/0158912 A1 * | 7/2008 | Chang et al. | | 362/628 |
| 2010/0165254 A1 * | 7/2010 | Lee et al. | | 349/65 |

FOREIGN PATENT DOCUMENTS

JP    01-244490    9/1989

(Continued)

*Primary Examiner* — Jong-Suk (James) Lee
*Assistant Examiner* — David J Makiya
(74) *Attorney, Agent, or Firm* — Greer, Burns & Crain, Ltd.

(57) ABSTRACT

An illumination device which can be used as a front light or a back light by improving brightness unevenness in the vicinity of an LED without dropping entire brightness and a liquid crystal display device using the same. This illumination device 10 has a light source on a light entering face 27 of a light guide plate 20 and a light guide plate 20 in which prisms 25 for reflecting by polarization or emitting light out of the light guide plate 20 are formed on a light emission face or a light reflecting face thereof and a cylindrical lens 26 for orienting and magnifying light is formed on the other face.

13 Claims, 7 Drawing Sheets

FOREIGN PATENT DOCUMENTS

| | | |
|---|---|---|
| JP | 10-282496 | 10/1998 |
| JP | 11-160700 | 6/1999 |
| JP | 2002-208306 | 7/2002 |
| JP | 2002-216530 A | 8/2002 |
| JP | 2003-114432 A | 4/2003 |
| JP | 2003-162915 | 6/2003 |
| JP | 2003-197019 | 7/2003 |
| JP | 2004-006326 A | 1/2004 |

* cited by examiner

ILLUMINATION DEVICE AND LIQUID CRYSTAL DISPLAY DEVICE

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2005/004780, filed on Mar. 17, 2005, the entire contents of which are hereby incorporated by reference.

TECHNICAL FIELD

The present invention relates to a liquid crystal display device using an illumination device and more particularly to a liquid crystal display device using an illumination device constituted of a light guide plate having a cylindrical lenses and prisms.

BACKGROUND ART

In recent years, the liquid crystal display device for use in a personal computer has been demanded to have higher display quality in terms of color representation, high brightness and high resolution. The liquid crystal display device is basically constituted of a liquid crystal panel and an illumination device, which is an illuminating means. The liquid crystal panel is classified to transmission type and reflection type and the transmission type liquid crystal panel has the illumination device on its rear face while the reflection type liquid crystal panel has the illumination device on its front face.

Figure 7:
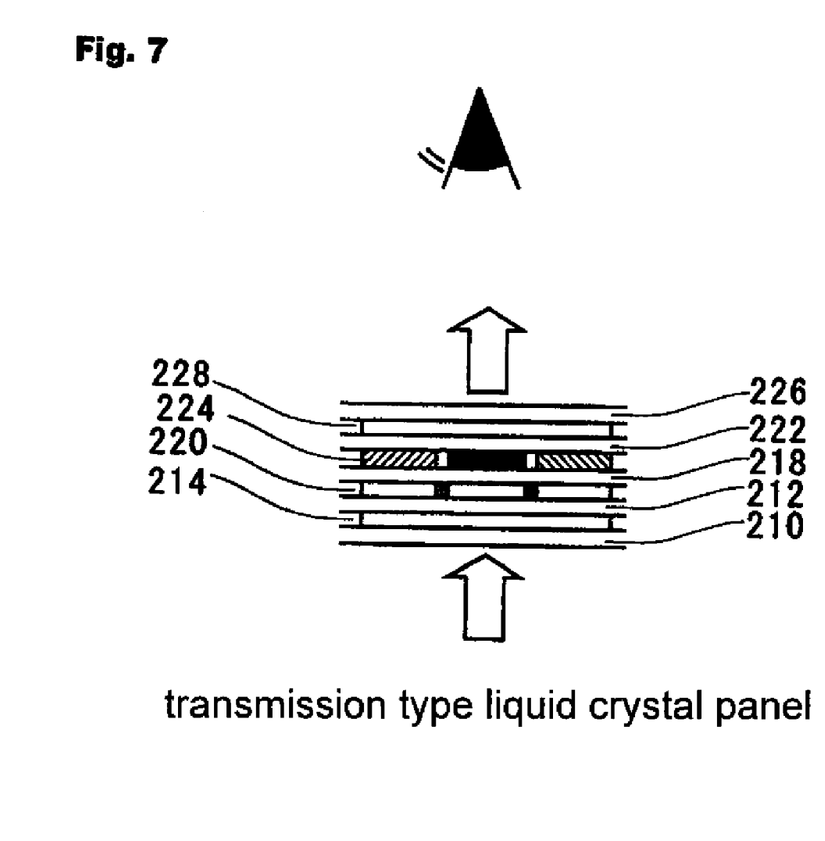
FIG. 7 is a sectional view showing a conventional transmission type liquid crystal panel.

FIG. 7 is a sectional view showing a conventional transmission type liquid crystal panel. In the transmission type liquid crystal panel, as shown in FIG. 7, a polarizer 214 is incorporated between a glass substrate 210 and a glass substrate 212. Bus line is formed on the glass substrate 212. Liquid crystal 220 is sealed between the glass substrate 212 and a glass substrate 218. A color filter 224 is sandwiched between the glass substrate 218 and a glass substrate 222. A polarizer 228 is sandwiched between the glass substrate 222 and a glass substrate 226.

In the transmission type liquid crystal panel, the color filter and the liquid crystal are sandwiched between the polarizers and in the reflection type liquid crystal panel, the polarizer 214 is replaced with a reflecting plate such as a mirror. In either liquid crystal panel, when linearly polarized light passes through the liquid crystal, the phase is modulated due to its characteristic and then, it passes through the color filter and when it passes through or is intercepted, white and black representations are produced. When plural pieces of this dot are arranged, character information or image information is created. On the other hand, because the liquid crystal is a light receiving type device, the aforementioned information cannot be recognized visually on the liquid crystal alone.

To solve this problem, generally, the illumination device as an illuminating means is disposed on the rear face (back) in case of the transmission type liquid crystal panel and in case of the reflection type liquid crystal panel, it is disposed on the front face (front). Because the reflection type liquid crystal panel is illuminated by the sun light or indoor light, it does not need any illumination device under such a condition. However, unless it is located under such illumination environment, it needs the illumination device like the transmission type. The illumination device is constituted of a point light source and a light guide plate and light emitted from the point light source such as LED is entered into the light guide plate and then projected to the entire surface of the liquid crystal panel.

The LED is disposed on an end face of the light guide plate and the light guide plate is formed such that the bottom face (opposite face to light emission face) of the light guide plate has an angle. LED light leaking from the top face (light emission face) of the light guide plate due to collapse of total reflection condition is emitted through prism sheet disposed thereon. Usually, 3-4 pieces of the LEDs are used in every 2 inch size. Because no light exists between the LEDs, brightness unevenness called eye ball in Japanese language is generated particularly in the vicinity of a LED upon which the LED light impinge, the eye ball being formed such that the brightness is high on the front face of the LED while the brightness is low between the LEDs. In the vicinity of the LED, it is difficult to adjust brightness because the total reflection condition cannot be controlled well and in the vicinity of the LED, there were problems such as lower luminance is generated.

Then, for example, patent document 1(Japanese Patent Application Laid-Open (JP-A) No. 2004-006326) has disclosed art in which a prism is formed on a light emission face or an opposite face to the light emission face while rough surface (scattering face) is formed on an opposite face to the prism face in order to prevent a lower luminance in the vicinity of the LED.

However, because light is scatted by the rough surface of the light, there is a problem that entire lower luminance although brightness unevenness in the vicinity of the LED is improved.

Additionally, patent document 2(JP-A No. 2002-216530) has disclosed another art of changing the taper angle of the light emission face or the opposite face to the light emission face of the light guide plate partially to prevent a lower luminance in the vicinity of the LED.

However, there was a problem that a line appears at a position in which the taper angle changes, thereby dropping the display quality.

Further, patent document 3(JP-A No. 2003-114432) has disclosed still another art of providing a light guide plate having lens arrays on both side faces, a light polarizing device on a light emission face of the light guide plate and a light reflecting device on a face opposing the light emission face so as to ensure an appropriate emitted light distribution.

DISCLOSURE OF INVENTION

To achieve the above-described object, the feature of an aspect of the present invention exists in an illumination device comprising a light source provided on the light entering face of a light guide plate, a prism reflecting by deviation or emitting light out of the light guide plate, the prism is formed on a light emission face or an opposite face to the light emission face and a cylindrical lens orienting and magnifying light, the cylindrical lens is provided on the other face.

The feature of another aspect of the present invention exists in a liquid crystal display device comprising an illumination device providing a liquid crystal panel, a light source providing on the light entering face of a light guide plate, a prism reflecting by deviation or emitting light out of the light guide plate, the prism is formed on a light emission face or an opposite face to the light emission face and a cylindrical lens orienting and magnifying light, the cylindrical lens is provided on the other face.

BEST MODE FOR CARRYING OUT THE INVENTION

Hereinafter the preferred embodiment of the present invention will be described with reference to the accompanying drawings. In the meantime, a description below indicates the best mode of the present invention and those skilled in art can carry out other embodiments by modifying or correcting within the scope of claims easily and the description below does not restrict the scope of claims for a patent.

Figure 1:
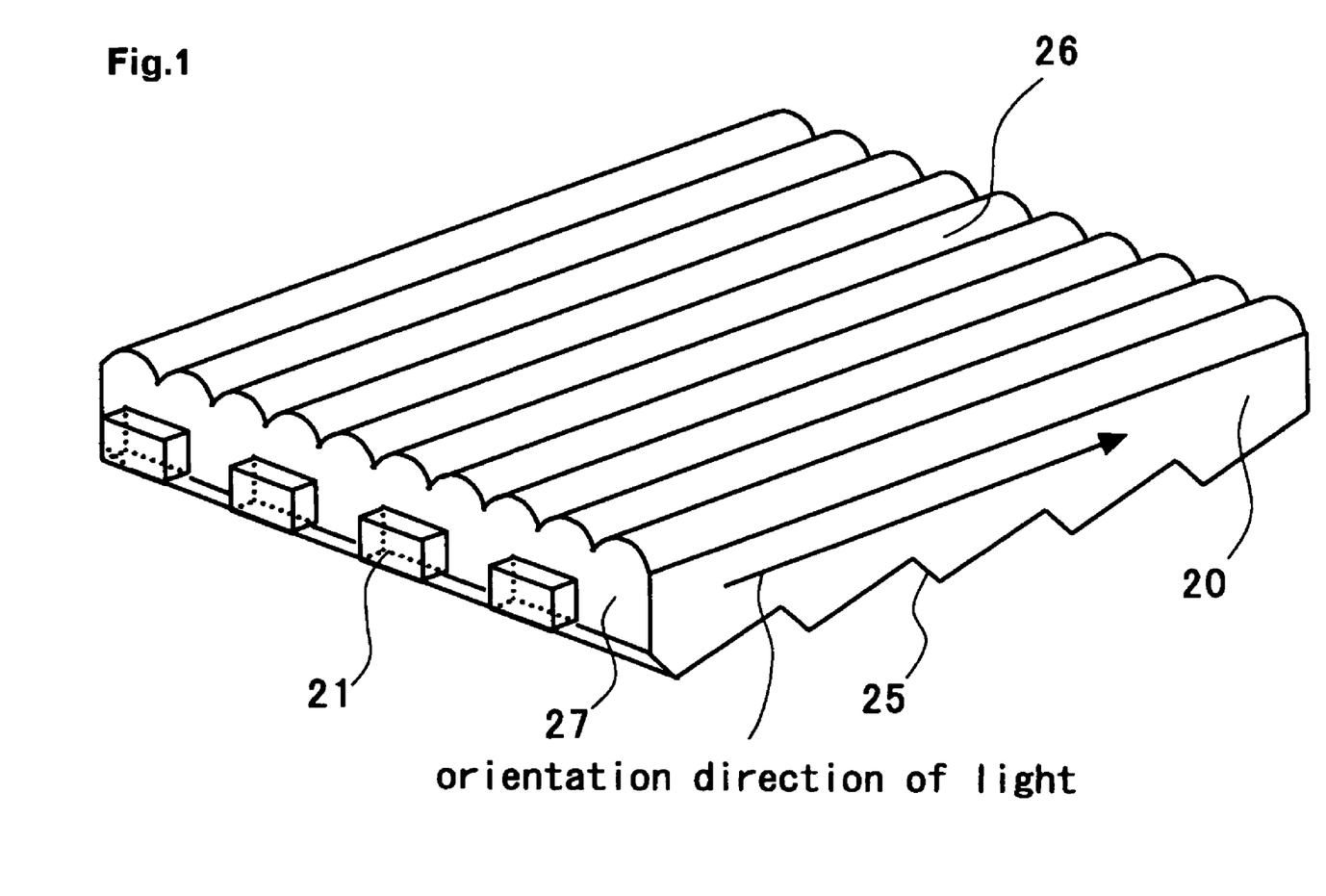
FIG. 1 is a diagram showing an example of the embodiment of the illumination device of the present invention.
Figure 2:
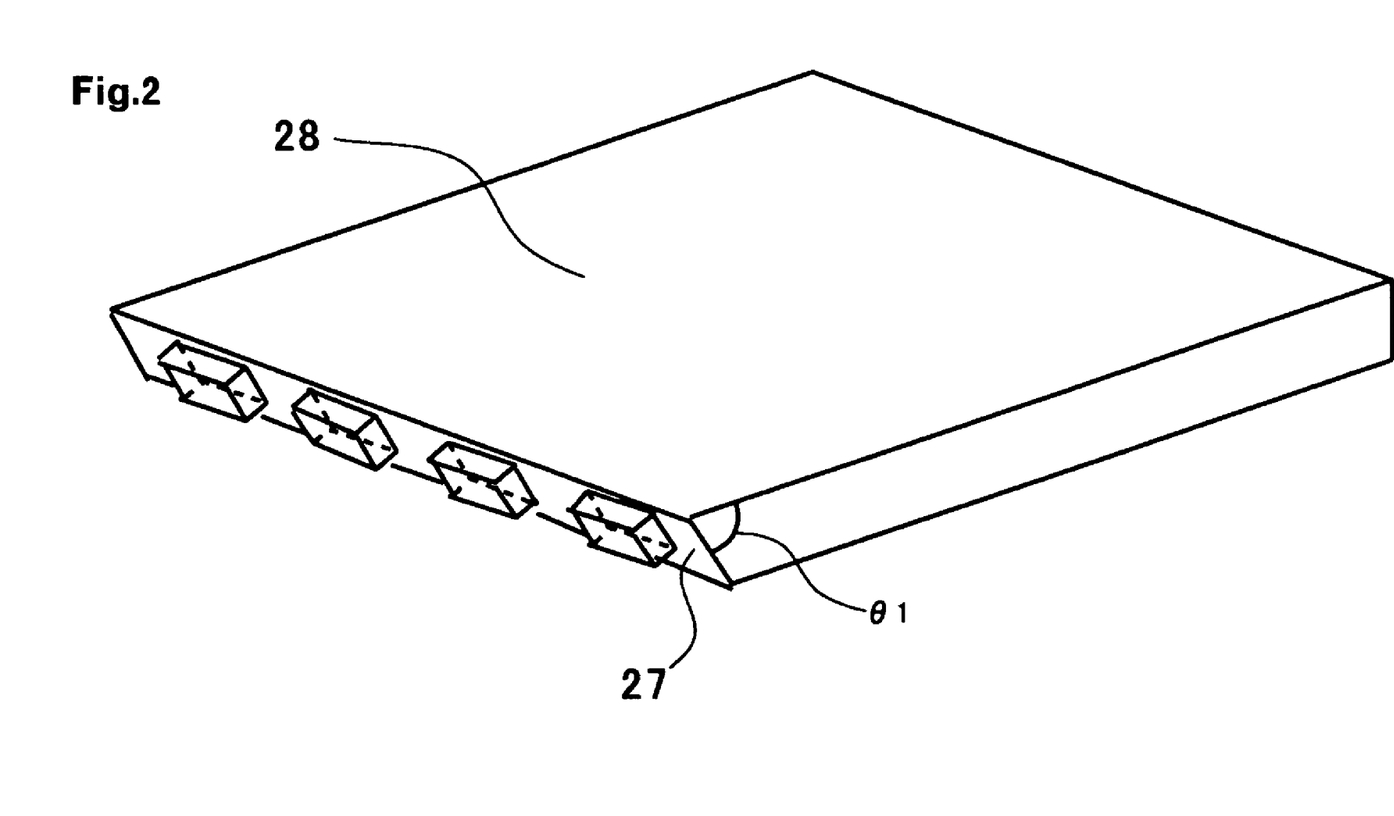
FIG. 2 is a diagram showing a shape of the light guide plate of the embodiment.
Figure 3:
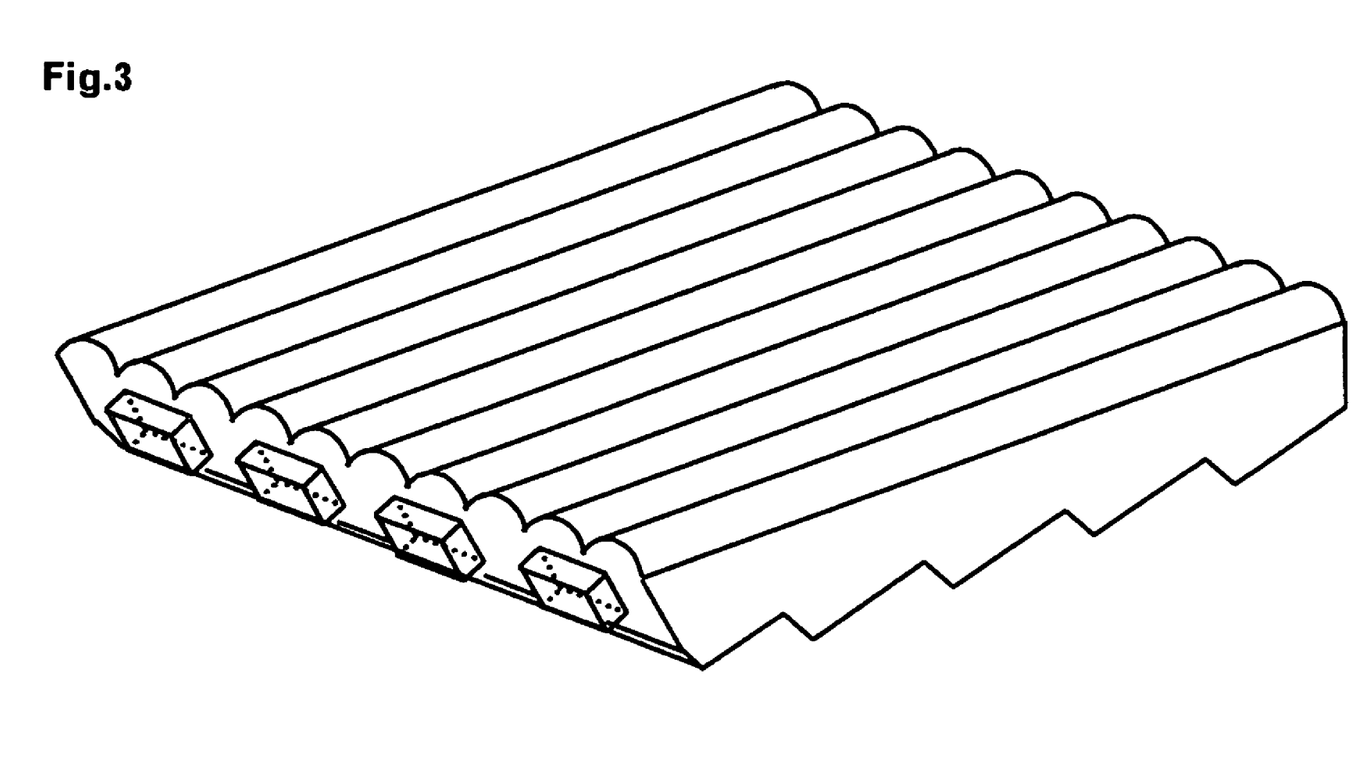
FIG. 3 is a diagram showing the illumination device using the light guide plate shown in FIG. 2.

FIG. 1 is a diagram showing an example of the embodiment of the illumination device of the present invention. FIG. 2 is a diagram showing a shape of the light guide plate of the embodiment. FIG. 3 is a diagram showing an illumination device using the light guide plate shown in FIG. 2.

As shown in FIG. 1, the illumination device is comprised of a LED 21 which is a point light source and a light guide plate 20. In FIG. 1, the light guide plate 20 is constituted of a prism 25 having a function of reflecting impinging light upon the light guide plate 20 totally to emit the light from a light guide body and a cylindrical lens array 26 having a function of orienting and magnifying the light reflected totally by a prism face 25 to the face opposing a face in which the prism 25 is formed. In this configuration, the face constituting the prism acts as the opposite face to the light emission face and the face constituting the cylindrical lens acts as a light emission face. Although in the illumination device shown in FIG. 1, the prism is formed on the opposite face to the light emission face, the prism may be formed on the light emission face.

A plurality of the LED light sources 21 are disposed at a specified interval on a light entering face 27 of the light guide plate 20. As shown in FIG. 1, the prisms 25 are formed a substantially perpendicular direction to the orientation direction of impinging light, the prisms 25 are further formed ridge lines in the orientation direction of light such that they are arranged in parallel continuously, ridge lines of the prisms 25 are formed in the substantially perpendicular direction of light to the orientation direction and they are arranged in parallel continuously. The shape of the prism 25 is of inequilateral triangle while one of its oblique side angle is 0.1-50°. Because the oblique side angle increases as it approaches the LED light source, light is reflected at any position of the opposite face to the light emission face so that it is emitted out of the light guide plate from the light emission face.

Light emitted from the LED light source 21 enter from the light entering face 27 of the light guide plate 20 while part thereof reaches the prism 25 formed on the bottom face. Light reaching the prism 25 is reflected totally by the prism 25 and oriented and magnified by a cylindrical lens array 26 formed on the light emission face of the light guide plate and then is emitted. Further, part of light reaches directly the cylindrical lens array 26 and is oriented and magnified and then emitted from the light emission face out of the light guide plate.

The prism formed on the opposite face to the light emission face is of inequilateral triangle and because the oblique side angle changes depending on a distance to the LED light source 21, any prism 25 can emit light in a substantially perpendicular direction to the light emission face of the light guide plate. Therefore, the face of the prism 25 does not need to be provided with any reflection plate, which is very effective for reduction of manufacturing cost.

The cylindrical lens 26 is formed on the light emission face and extends in the orientation direction of light entering the light guide plate and its ridge line is formed in the perpendicular direction to the orientation direction of light. In the cylindrical lens 26, its light emission face is curved in a projecting shape. To facilitate processing, this curved line may be of pseudo curved line combining a straight line. The cylindrical shape enables light to be oriented and magnified and emitted out of the light guide plate 20, thereby preventing a lower luminance.

Because as shown in FIG. 2, an angle formed by the light entering face 27 and a light emission face 28 is set to less than 90° as an example of the light guide plate, the quantity of the light emission to entering light increases in a region near the light entering face of the light emission face. Therefore, use of this light guide plate 20 enables the illumination device 10 shown in FIG. 3 to erase a dark portion just after entering of light in the light guide plate 20. Particularly, brightness unevenness in the vicinity of the LED is improved. Further, because the quantity of light emitted directly to the light emission face from the light guide plate 20 increases, scattering of light in the light guide plate 20 is prevented thereby preventing a lower luminance.

Figure 4:
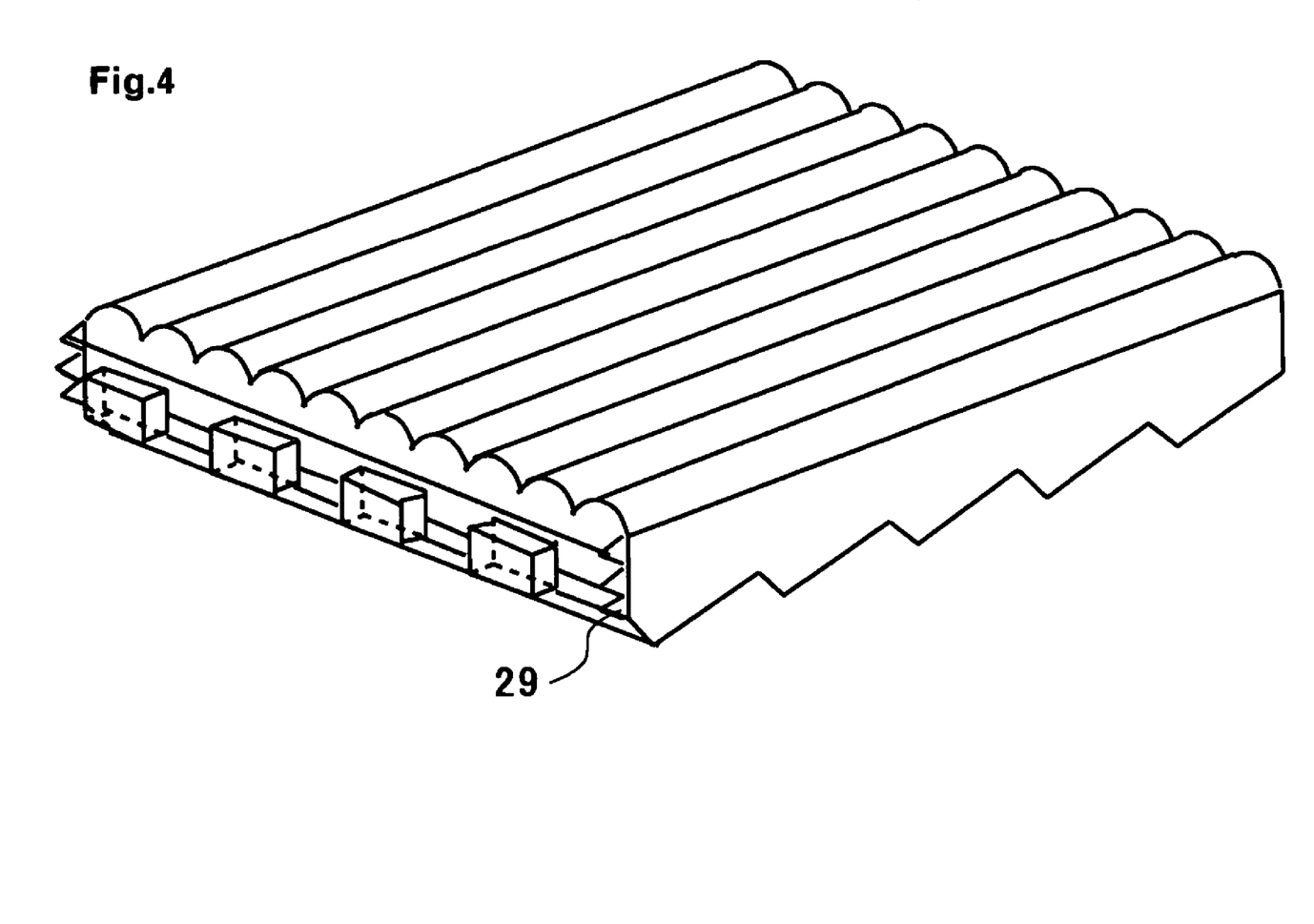
FIG. 4 is a diagram showing formation of a prism array in the light entering face of the light guide plate.

FIG. 4 is a diagram showing formation of a prism array in the light entering face of the light guide plate. In the prism array 29, its ridge lines are formed in the small width direction of the light entering face of the light guide body, that is, in the directions of the light emission face and the opposite face to the light emission face. Further, in the cylindrical lens 26 as well as the prism array, its ridge line may be formed in the small width direction of the light entering face. Consequently, the dark portion just after entering of light in the light guide plate 20 can be eliminated effectively.

Figure 5:
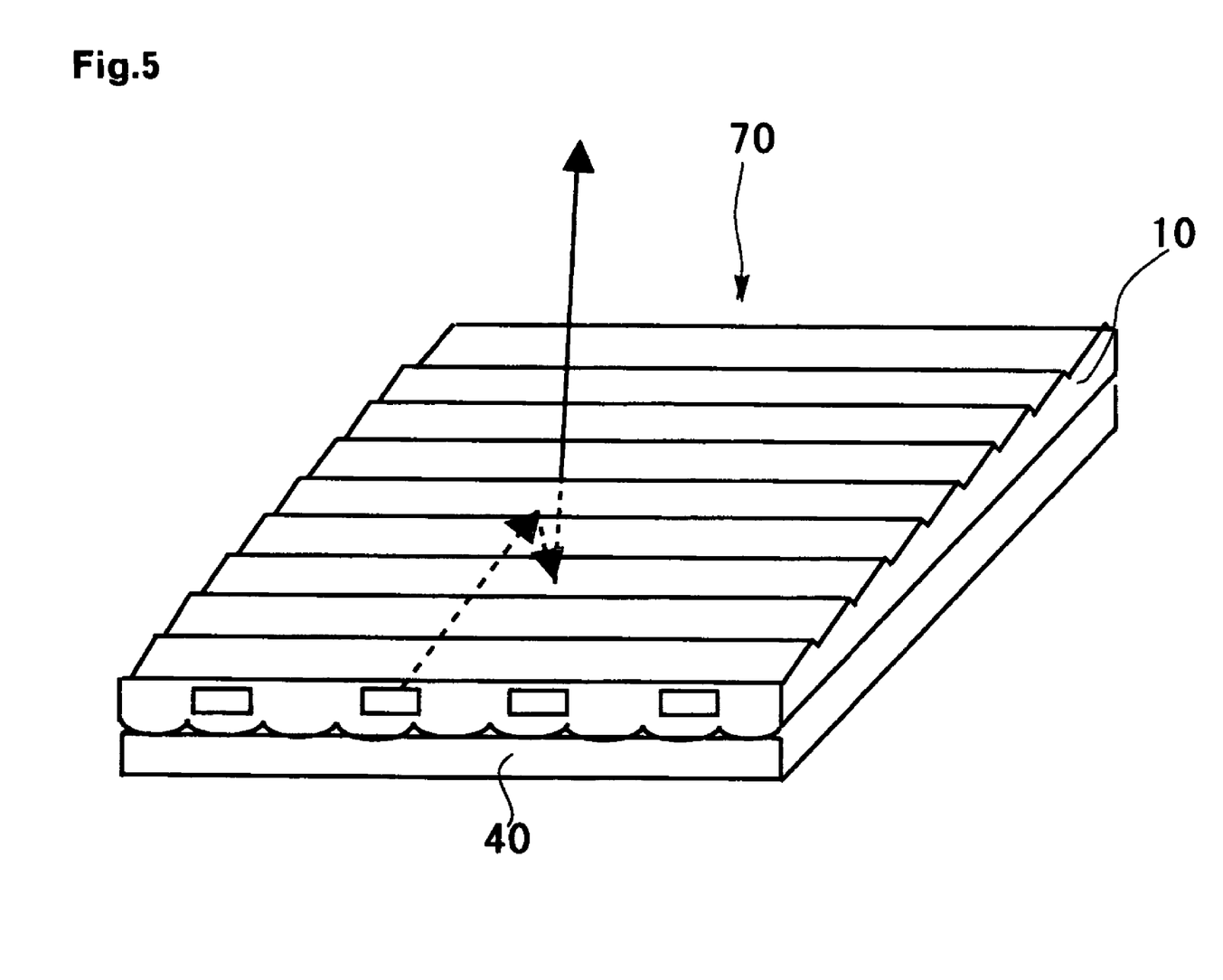
FIG. 5 shows an embodiment of a liquid crystal display device using the reflection type liquid crystal panel.

FIG. 5 shows an embodiment of a liquid crystal display device using the reflection type liquid crystal panel. As shown in FIG. 5, this is a reflection type liquid crystal display device 70, which uses the light guide plate 20 of the embodiment as a front light which is the illumination device 10.

Figure 6:
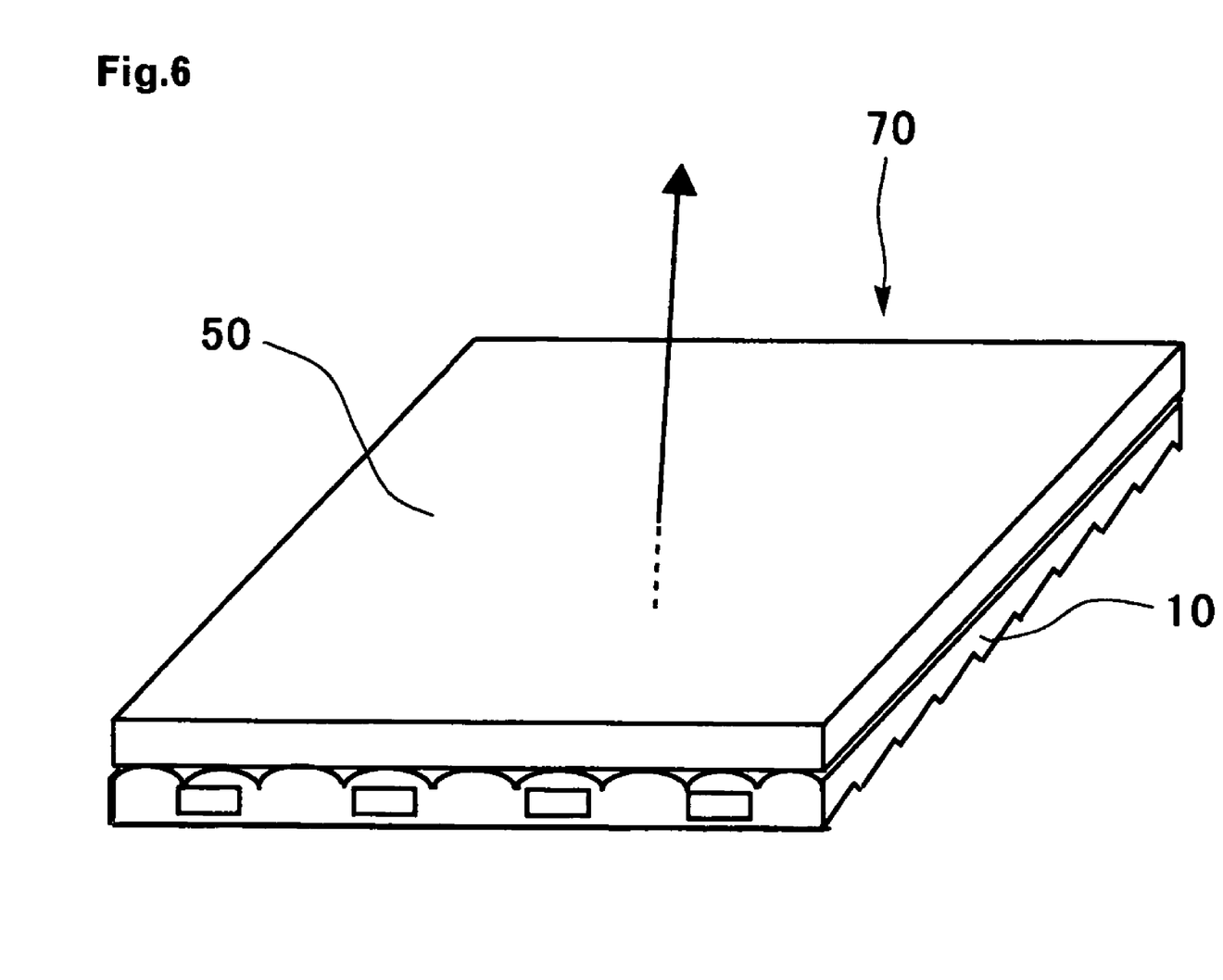
FIG. 6 shows an embodiment of the liquid crystal display device using the transmission type liquid crystal panel.

FIG. 6 shows an embodiment of the liquid crystal display device using the transmission type liquid crystal panel. As shown in FIG. 6, this is a transmission type liquid crystal display device 70 which uses the light guide plate 20 of the embodiment as a back light which is the illumination device 10.

By constituting the liquid crystal display device 70 using the illumination device 10 of the embodiment, the liquid crystal display device 70 which ensures an even distribution and high brightness can be provided at a low cost.

As shown in the embodiment of the present invention, the cylindrical lenses 26 extending in the orientation direction of light are formed on the light emission face of the light guide plate 20 in parallel continuously in the orientation direction and the perpendicular direction of light and the prisms 25 are formed on the opposite face to the light emission face in the orientation direction and the perpendicular direction of impinging light upon the light guide body, such that they are disposed in parallel continuously in the orientation direction of light. Consequently, this can be used as a back light or front light.

The invention claimed is:

1. An illumination device comprising:
a light guide plate,
a light source directly on a light entering face of said light guide plate,
prisms which reflect light from the light guide plate formed on an opposite face to a light emission face, wherein said prisms extend in a first direction from one edge of the light guide plate to an opposite edge of the light guide plate, wherein said prisms are each formed of a non-equilateral triangle, in cross-section, having first and second oblique side angles, wherein said first oblique side angle is closer to said light source than said second oblique side angle, and further wherein said first oblique side angle is greater than said second oblique side angle, and
a cylindrical lens array for orienting and magnifying light formed on the light emission face, wherein said cylindrical lens array extends in a second direction from one edge of the light guide plate to an opposite edge of the light guide plate, where said second direction is perpendicular to said first direction, and wherein said cylindrical lens array is formed of a plurality of convexly curved surfaces,
wherein the cylindrical lens array is formed of curved lines,
wherein light exits the device in a direction substantially perpendicular to a plane defined by the light emission face, and
wherein an angle formed by the light entering face and the light emission face is less than 90°, whereby said light source is attached to said light entering face in a tilted manner, with respect to said light emission face, at said angle.

2. The illumination device according to claim 1, wherein the cylindrical lens array forms its ridge line in a perpendicular direction to a small width direction of the light entering face.

3. The illumination device according to claim 1, wherein light from the light source enters the light emission face directly from the light source.

4. The illumination device according to claim 1, wherein said cylindrical lens array is formed of a plurality of uniformly curved smooth surfaces.

5. The illumination device according to claim 1, wherein said light source comprises a plurality of LED light sources.

6. The illumination device according to claim 1, wherein said first oblique side angle changes as the distance from the light source increases.

7. The illumination device according to claim 1, wherein said first oblique side angle increases as the distance from the light source decreases.

8. A liquid crystal display device comprising:
an illumination device which has a liquid crystal panel and a plurality of LED light sources directly attached to a light entering face of a light guide plate, wherein prisms which reflect light from the light guide plate are formed on an opposite face to a light emission face, wherein said prisms extend in a first direction from one edge of the light guide plate to an opposite edge of the light guide plate, wherein said prisms are each formed of a non-equilateral triangle, in cross-section, having first and second oblique side angles, wherein said first oblique side angle is closer to said light source than said second oblique side angle, and further wherein said first oblique side angle is greater than said second oblique side angle,
a cylindrical lens array for orienting and magnifying light is formed on the light emission face, wherein said cylindrical lens array extends in a second direction, where said second direction is perpendicular to said first direction from one edge of the light guide plate to an opposite edge of the light guide plate, and wherein said cylindrical lens array is formed of a plurality of convexly curved surfaces,
wherein the cylindrical lens array is formed of curved lines, wherein light exits the device in a direction substantially perpendicular to a plane defined by the light emission face, and
wherein an angle formed by the light entering face and the light emission face is less than 90°, whereby said plurality of LED light sources are attached to said light entering face in a tilted manner, with respect to said light emission face, at said angle.

9. The liquid crystal display device according to claim 8, wherein the cylindrical lens array forms its ridge line in a perpendicular direction to a small width direction of the light entering face.

10. The liquid crystal display device according to claim 8, wherein light from said plurality of LED light sources enters the light emission face directly from said plurality of LED light sources.

11. The liquid crystal display device according to claim 8, wherein said cylindrical lens array is formed of a plurality of uniformly curved smooth surfaces.

12. The liquid crystal display device according to claim 8, wherein said first oblique side angle changes as the distance from the light source increases.

13. The liquid crystal display device according to claim 8, wherein said first oblique side angle increases as the distance from the light source decreases.

* * * * *